United States Patent Office 3,701,818
Patented Oct. 31, 1972

3,701,818
O-(HALOVINYL) PHOSPHORODI-CHLORIDOTHIOATES
Samuel B. Soloway and Juan G. Morales, Modesto, Calif., assignors to Shell Oil Company, New York, N.Y.
No Drawing. Filed Oct. 9, 1970, Ser. No. 79,630
Int. Cl. A01n 9/36; C07f 9/16, 9/20
U.S. Cl. 260—957    4 Claims

ABSTRACT OF THE DISCLOSURE

O-(halovinyl) phosphorodichloridothioates are useful as chemical intermediates in the preparation of biologically active O-(halovinyl) O,O-dihydrocarbyl phosphorothioates.

---

This invention relates to novel O-(halovinyl) phosphorodichloridothioates and their method of preparation. More particularly, this invention relates to novel O-(2,2-dichlorovinyl) phosphorodichloridothioate and O-(2-chlorovinyl) phosphorodichloridothioate and the method of preparation of these compounds.

Beta-halovinyl phosphates are well known in the art to be biologically active and numerous references in the patent literature as well as other publications document the activity of these compounds as biologicals. For example see Lichtenthaler Chem. Rev., vol. 61, pp. 607–649. While certain of the corresponding beta-chlorovinyl thionophosphates are known in the art (see Seume et al., Toxicol. Appl. Pharmacol., 2, 495 (1960); and Ward et al., U.S. Pat. 3,174,990), certain other beta-halovinyl thionophosphates have heretofore been unobtainable.

It has now been found that the novel intermediate O-(halovinyl) phosphorodichloridothioate having the formula

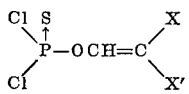

wherein X is halogen and X' may be halogen or hydrogen, may be used to prepare O-(halovinyl) thionophosphates. These novel O-(halovinyl) thionophosphates are claimed in a separate application, filed on even date herewith as Ser. No. 79,699.

While X in the above formula is preferably chlorine, it may also be selected from the group consisting of bromine, chlorine, fluorine, and iodine. X' is preferably chlorine, but may also be bromine, fluorine, iodine or hydrogen.

The compounds of this invention may be prepared by the reaction of O-(halovinyl) phosphorodichloridates with phosphorous pentasulfide. The starting phosphorodichloridate is obtained by the treatment of dimethyl 2,2-dichlorovinyl phosphate with thionyl chloride in the presence of dimethylformamide (DMF), as described in Belgian Pat. 694,814, dated Feb. 28, 1967. The compounds of the present invention may be further reacted or converted into biologically active compounds by reacting them with an alcohol in the presence of a base or with a metal alcoholate in an organic solvent such as tetrahydrofuran or benzene.

EXAMPLE I

O-(2,2-dichlorovinyl) phosphorodichloridothioate

A 411.9 gram (1.79 mole) sample of 2,2-dichlorovinyl phosphorodichloridate was added to 200 grams (0.9 mole) of phosphorus pentasulfide. A nitrogen atmosphere was maintained while the reaction mixture was heated for 5.5 hours in an oil bath at 165° C. The reaction mixture was an homogeneous deep burgundy viscous liquid. Methylene chloride (500 ml.) was then added to the reaction product causing a solid to separate. The solid was filtered to give 94.5 grams of black powdery crystals containing some light colored amorphous solid dispersed through it. The filtrate was stripped in a rotating evaporator at 50–60° C. and 1.5 millimeters mercury pressure to remove solvent and light ends, which were discarded. The filtrate was then further stripped at 110° C. The light ends obtained from this second stripping amounted to 263.4 grams. This fraction was distilled through a 16″ x 0.5″ helix packed column with a variable reflux head. Product was collected at a reflux head temperature of from 39–43° C. and 0.02 mllimiter pressure and amounted to 123.7 grams of O-(2,2 - dichlorovinyl) phosphorodichloridothioate; yield, 29.3%. The composition of the product was determined by gas liquid chromatography and the structure of the product was confirmed by nuclear magnetic resonance (NMR) and infrared spectra as well as by chemical analysis for the P→S bond. Elemental analysis for PSOCl₄C₂H was as follows:

Calculated (percent): S, 13.0; P, 12.6; Cl, 57.7. Found (percent): S, 13.0; P, 12.6; Cl, 57.8. O-(2-chlorovinyl) phosphorodichloridothioate may be prepared in like manner.

EXAMPLE II

O-(2-chloro-2-fluorovinyl) phosphorodichloridothioate

A mixture of 60 grams of O-(2-chloro-2-fluorovinyl) phosphorodichloridate and 22 grams of P₂S₅ was heated with stirring at 110–120° C. using an oil bath. After two hours the mixture was cooled and 2 volumes of pentane was added. The solution was decanted from a tarry insoluble residue and stripped and distilled under reduced pressure. A 24 gram fraction boiling at 75–82° C. (30 mm. pressure) was collected containing O-(2-chloro-2-fluorovinyl) phosphorodichloridothioate.

The reaction may be carried out by heating the phosphorodichloridate with phosphorous pentasulfide at a temperature of about 155 to 180° C. for about 4 to 6 hours or until the reaction is completed. The ingredients are usually reacted in a molar ratio of about 2 to 3 moles of the phosphorodichloridate to 1.0 mole of phosphorus pentasulfide.

The reaction product may be recovered from the reaction mixture by conventional procedure such as dilution with a solvent such as methylene chloride followed by filtration to remove any precipitate that may have formed. The filtrate may then be distilled to remove the solvent after which the product may be recovered by fractional distillation.

The compounds of this invention may be used as intermediates to prepare beta-halovinyl thionophosphates and particularly the dialkyl beta-halovinyl thionophosphates which are useful as pesticides and also as anthelmintics.

EXAMPLE III

O-(2,2-dichlorovinyl) O,O-dimethyl phosphorothioate

A 12.95 gram (0.240 mole) portion of sodium methoxide was suspended in about 70 milliliters of tetrahydrofuran. The mixture was cooled to —5° C. and 30 grams (0.112 mole) of O-(2,2-dichlorovinyl) phosphorodichloridothioate was added. The reaction temperature was maintained at about —5 to 0° C. for two hours and at 32° C. for two more hours. Solvent was removed in a rotating evaporator. The residue was diluted with methylene chloride and a finely-divided salt was removed by filtration. The filtrate was stripped in a rotating evaporator at 40° C. at 0.5 millimeter of pressure to leave a residue of 26.4 grams. This crude residue was further distilled in a falling film molecular still at 61° C. (0.02 millimeter pressure) to yield 11.4 grams of a distillate, 2.0 grams of residue, and 7.3 grams of light ends. The distillate and light ends were combined and redistilled through an 8" x ⅜" helix pack column and a variable reflux head to yield 12 grams of product (41.5%). The composition of the product was determined by gas liquid chromatography (GLC) and further identification of the product was made by NMR spectrum as well as by infrared analysis. Elemental analysis was made of the product containing O-(2,2-dichlorovinyl) O,O-dimethyl phosphorothioate and a minor amount of the starting material O-(2,2-dichlorovinyl) phosphorodichloridothioate.

EXAMPLE IV

The mammalian toxicity for the compound prepared in Example IV was measured in terms of the $LD_{50}$ in mice, i.e. the milligrams of active ingredient per kilogram of body weight to be lethal to 50% of the mice tested, and was found to be 933 milligrams per kilogram. When the compound of Example IV was compared with Parathion as a housefly insecticide standard, it was found to have a toxicity index (T.I.) of about 36–48 (Parathion=100). However, Parathion has an $LD_{50}$ in rats of about 6–15 milligrams per kilogram. While the O-(2,2-dichlorovinyl) O,O-dimethyl phosphorothioate is not as active as insecticide as Parathion at equal concentrations, it is an effective insecticide and possesses a much lower degree of mammalian toxicity.

We claim as our invention:
1. A compound of the formula

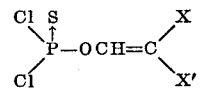

wherein X is halogen and X' is halogen or hydrogen.
2. A compound according to claim 1 wherein X and X' are chlorine.
3. A compound according to claim 1 wherein X is chlorine and X' is hydrogen.
4. A compound according to claim 1 wherein X is chlorine and X' is fluorine.

References Cited

FOREIGN PATENTS 166,695  12/1962  U.S.S.R. _____ 260—957

OTHER REFERENCES

Houben-Weyl, Methoden der Organischen Chemie, 12/2 (1964) p. 592.

Golobov et al., Chemical Abstracts, vol. 68 (1968), para. 114.710r, p. 11062.

LEWIS GOTTS, Primary Examiner

R. L. RAYMOND, Assistant Examiner

U.S. Cl. X.R.

260—985; 424—219